Oct. 5, 1954 E. M. ROSCHKE 2,691,060

SUBSCRIPTION TELEVISION TRANSMITTER

Filed Sept. 27, 1950 3 Sheets-Sheet 1

ERWIN M. ROSCHKE
*INVENTOR.*

BY Francis W. Crotty

HIS ATTORNEY

ERWIN M. ROSCHKE
*INVENTOR.*
BY Francis W. Crotty
*HIS ATTORNEY*

SUBSCRIPTION TELEVISION TRANSMITTER

Filed Sept. 27, 1950 3 Sheets-Sheet 3

ERWIN M. ROSCHKE
INVENTOR.

BY Francis W. Crotty
HIS ATTORNEY

Patented Oct. 5, 1954 2,691,060

UNITED STATES PATENT OFFICE 2,691,060

SUBSCRIPTION TELEVISION TRANSMITTER

Erwin M. Roschke, Broadview, Ill., assignor to Zenith Radio Corporation, a corporation of Illinois Application September 27, 1950, Serial No. 187,072

4 Claims. (Cl. 178—5.1)

Figure 1:
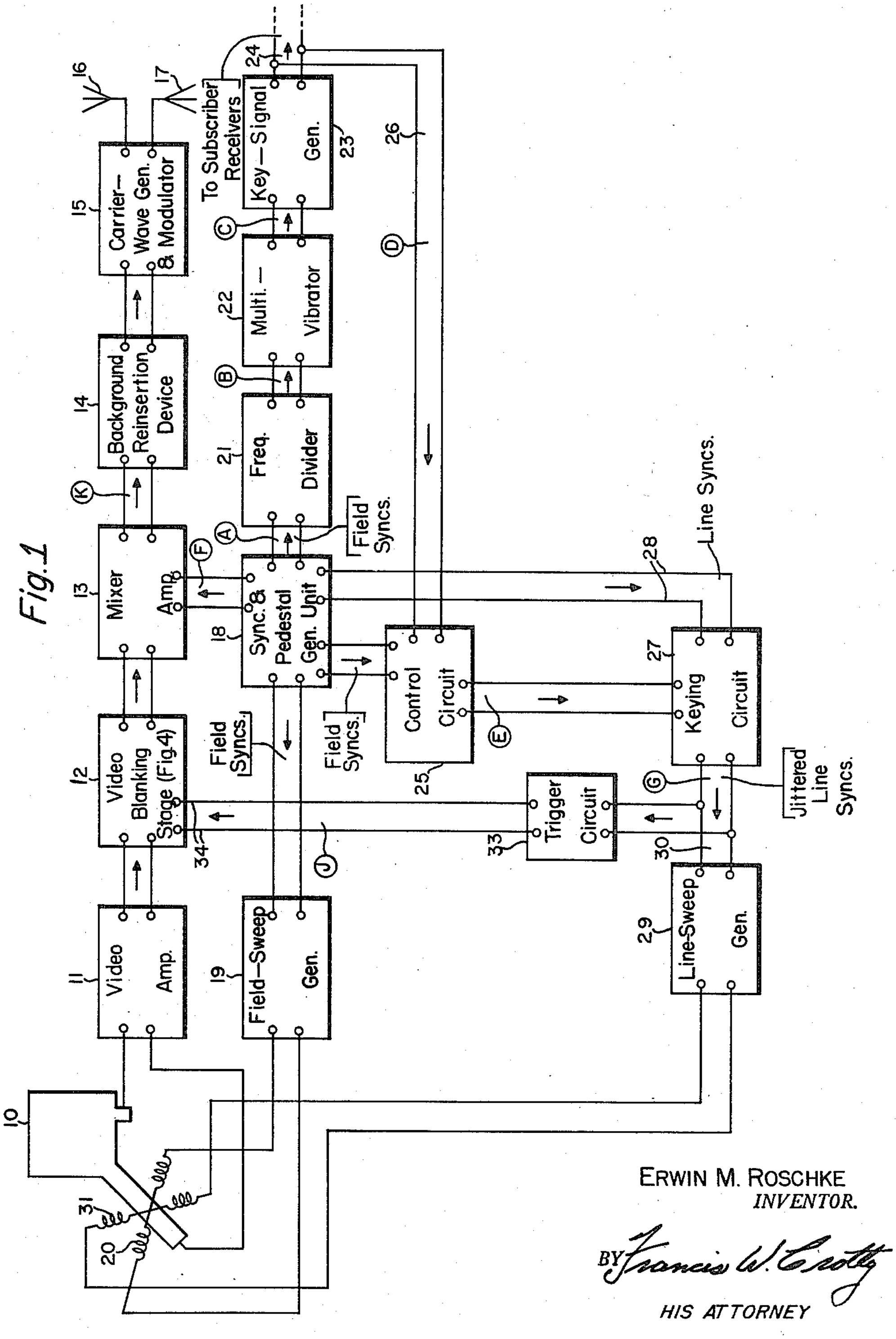

This invention relates to subscriber television systems of the type in which a coded television signal is transmitted over a first channel and a key signal for decoding the coded signal is transmitted to subscriber receivers over a second channel, preferably a line circuit. More specifically, the present invention is directed to an improved subscription television transmitter which utilizes an improved type of video-signal blanking stage for preventing distortion that might otherwise arise in the transmitted coded television signal.

Copending application Serial No. 773,848, filed September 13, 1947, in the name of Erwin M. Roschke, entitled "Image Transmission System," which has now issued as Patent 2,547,598, April 3, 1951, and assigned to the present assignee, discloses a subscription television system wherein the transmitted television signal is coded by altering the relative timing of the video and synchronizing components during spaced intervals. A key signal, indicating the times of occurrence of these spaced intervals, is generated at the transmitter and distributed to subscriber receivers over a line circuit. The key signal is utilized at the various receivers to actuate decoding apparatus and enable the receivers to decode and reproduce the coded subscription television signal. It has been found that when the coded television signal of this system is corrected at a subscriber receiver a flicker sometimes appears in the reproduced image. This flicker is caused by the inequality of picture content in successive video fields of the television signal as the timing of the video components relative to the synchronizing components is altered in accordance with the coding schedule. Such inequality of picture content gives rise to a low-frequency signal that is usually not translated faithfully by the various stages of the transmitter, thus producing distortion in the coded television broadcast which results in the aforementioned flicker in the image reproduced.

A system for eliminating the above-described condition is disclosed in copending application Serial No. 31,345, filed June 5, 1948, in the name of Pierce E. Reeves, entitled "Subscriber Transmission System," and assigned to the present assignee. This system includes a video-signal blanking stage which replaces a predetermined portion of each line trace of video signal with a pulse of a reference potential level independent of the instantaneous value of the video signal, the position of this portion within the line-trace interval being changed whenever the timing of the video components of the television signal is altered as prescribed by the coding schedule.

In accordance with the teachings of the Reeves application, the potential level of the pulses is adjusted to have a value corresponding to some gray shade in the video signal. This was considered desirable since the timing of these pulses is changed in accordance with the coding schedule and, should they have an amplitude in excess of the maximum amplitude of the video signal, it would be possible for unauthorized receivers to utilize such pulses for synchronizing purposes and, thus, reproduce the coded signal. It has been found that under some conditions, even though the potential level of these pulses is made to correspond to some intermediate value of the video signal, it is still possible for unauthorized receivers to derive the required synchronizing information therefrom.

The present invention provides a system in which a random noise signal is superimposed on the aforementioned pulses to provide a composite signal having an amplitude extending, preferably, to the maximum instantaneous value of the video signal. Due to the random nature of the noise signal, it is practically impossible for an unauthorized receiver to utilize the composite signal for synchronizing purposes. Yet, the signal performs the function of equalizing the picture content in successive video fields of the television signal to remove the afore-mentioned distortion therein.

It is, accordingly, an object of the invention to provide an improved subscription type television system which transmits a coded television signal in which distortion that sometimes occurs due to inequality of picture content in successive video fields is eliminated for all practical purposes.

Another object of this invention is to provide an improved system by means of which the distortion is removed from the television signal by the introduction of a composite signal having a timing that is altered in accordance with the coding schedule and having such a wave-form that unauthorized synchronization thereon is rendered practically impossible.

Figures 2, 3:
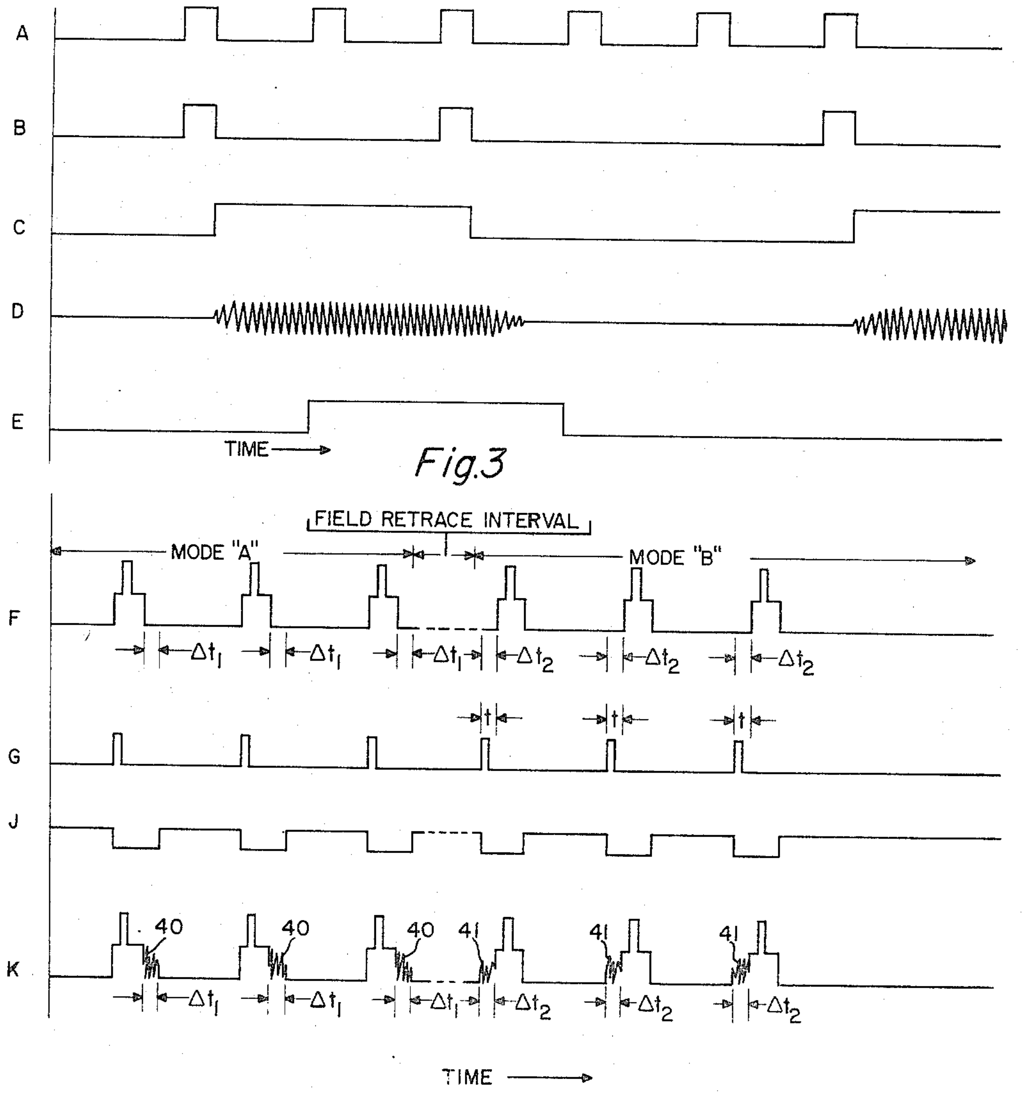
Figure 4:
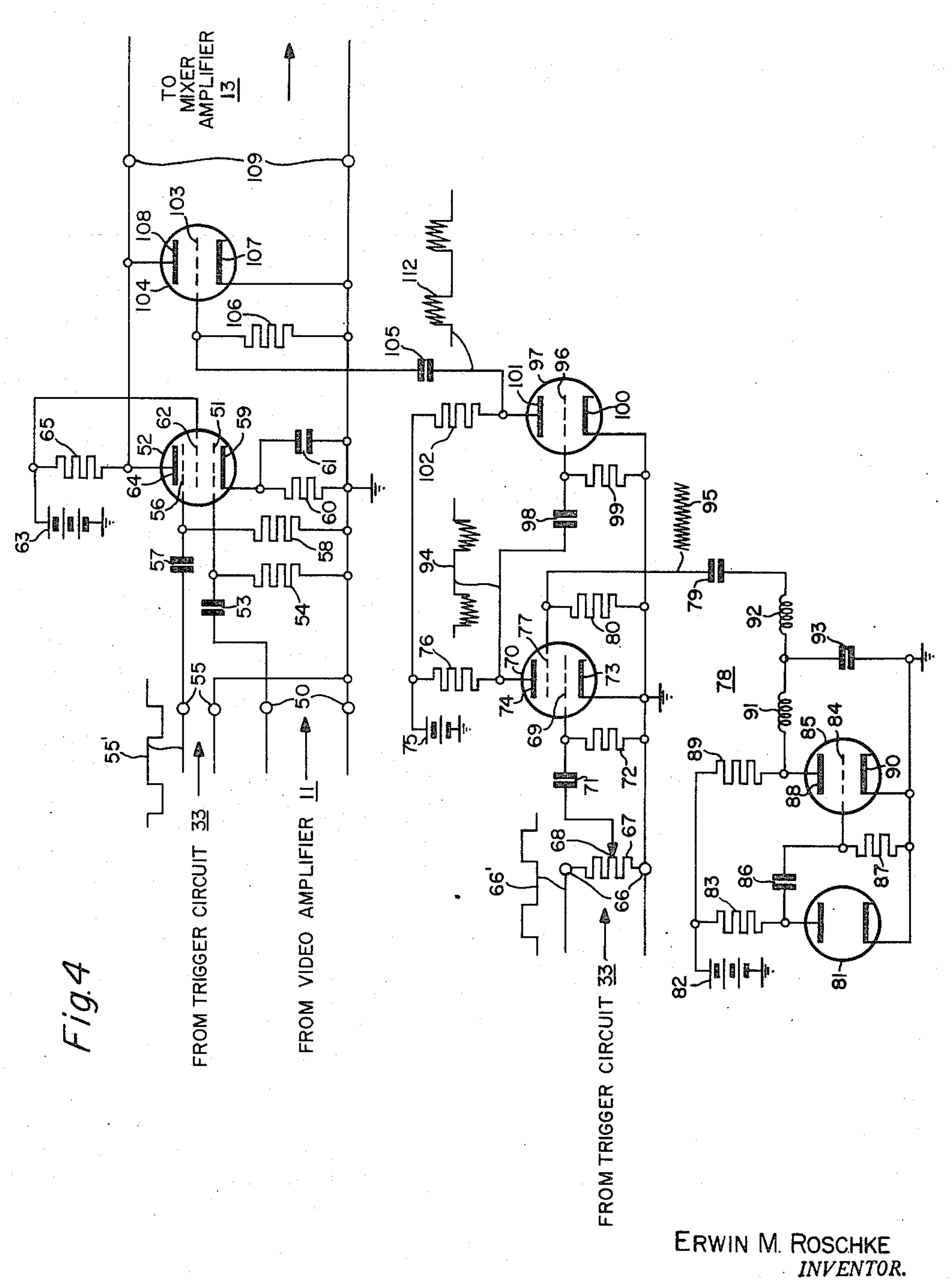

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a subscription television transmitting system constructed in accordance with the invention, Figures 2 and 3 comprise various curves indicating the operation of the system of Figure 1, and Figure 4 is a detailed representation of one of the components of the transmitter.

The television transmitting system of Figure 1 includes a video-frequency generating device or camera tube 10 which may be of any well-known type and which is connected to a video amplifier 11 of any desired number of stages having an output circuit connected to a video-blanking stage 12, constructed in accordance with the present invention and described in detail hereinafter. The output terminals of stage 12 are connected to a mixer amplifier 13 having output terminals connected to a background reinsertion device 14. The latter is connected to a carrier-wave generator and modulator 15 which may be coupled to a suitable antenna circuit 16, 17. The transmitting system further includes a synchronizing signal and pedestal generating unit 18 connected to mixer amplifier 13 to supply line- and field-synchronizing and pedestal pulses thereto. Unit 18 is also connected to a field-sweep generator 19 and supplies field-synchronizing pulses to this generator. Field-sweep generator 19 is coupled to field-deflection elements 20 of device 10. Unit 18 is also coupled to a frequency divider 21 and supplies field-synchronizing pulses thereto. The divider 21 is preferably of the random type disclosed in copending application Serial No. 32,457, filed June 11, 1948, and issued March 11, 1952, as U. S. Patent 2,558,413, in the name of Erwin M. Roschke, entitled "Random Frequency Divider," and assigned to the present assignee. The output terminals of frequency divider 21 are connected to a multivibrator 22 which, in turn, is connected to a key-signal generator 23, the key-signal generator being coupled to a line circuit 24 which extends to various subscriber receivers.

Unit 18 is also connected to a control circuit 25 and supplies field-synchronizing pulses thereto, control circuit 25 being connected to a keying circuit 27 and being further connected to the output terminals of key-signal generator 23 by way of leads 26. Unit 18 is connected to keying circuit 27 by way of leads 28 and supplies line-synchronizing pulses thereto. The output terminals of keying circuit 27 are connected to a line-sweep generator 29 by means of leads 30, and the output terminals of generator 29 are connected to line-deflection elements 31 of device 10. The leads 30 are also connected to the input terminals of a trigger circuit 33, having output terminals connected to video-signal blanking stage 12 by way of leads 34.

Device 10 generates a video-frequency signal representing a subject scanned thereby, and this video signal is amplified in video amplifier 11, translated through blanking stage 12, and mixed with synchronizing and pedestal pulses from unit 18 in mixer amplifier 13. The resulting television signal is adjusted as to background level in device 14 and is modulated on a suitable carrier wave in unit 15 for radiation by means of antenna 16, 17. Field-synchronizing pulses from unit 18 are applied to field-sweep generator 19 to control the field scansion of device 10 and line-synchronizing pulses from unit 18 are supplied to line-sweep generator 29 by way of keying circuit 27 to control the line scansion.

Field-synchronizing pulses from unit 18, represented in curve A of Figure 2, are impressed on frequency divider 21 and the resulting frequency-divided pulses, shown in curve 2B, are used to trigger multivibrator 22. The multivibrator is, preferably, of the well-known "Eccles Jordan" type, that is, a multivibrator circuit that may be triggered between two stable operating conditions by successive pulses of like polarity. The output pulses from multivibrator 22 are shown in curve 2C, and are used to actuate key-signal generator 23. The key-signal generator produces a burst of key signal, as shown in curve 2D, on line circuit 24 in response to each positive-pulse component of the output signal from multivibrator 22. In this manner, a burst of key signal is generated on line circuit 24 during spaced operating intervals which occur preferably at random times and each burst is initiated and terminated by frequency-divided field-synchronizing pulses and, thus, during field-retrace intervals.

The bursts of key signal from generator 23 are further impressed on control circuit 25 by way of leads 26. The control circuit is so constructed that it is actuated from one operating condition to another by the field-synchronizing pulse succeeding the initiation of each key-signal burst and is returned to the first operating condition by the field-synchronizing pulse succeeding the termination of each such key-signal burst. The control circuit impresses actuating or control pulses, as shown in curve 2E, on keying circuit 27. The keying circuit alters the timing of the line-synchronizing pulses translated therethrough by a preselected amount in response to and throughout the duration of each control pulse from control circuit 25. This causes the timing of the line scansion of device 10 to be altered by a corresponding amount during spaced intervals and, hence, causes an alteration in the timing of the video signal generated thereby relative to the line-synchronizing pulses generated by unit 18. In this manner, the television signal radiated by antenna circuit 16, 17 is coded ad standard television receivers are unable to reproduce the intelligence represented thereby since such receivers require an invariable time relation of video to synchronizing information to synthesize an intelligible image.

Due to the fact that the control pulses supplied to keying circuit 27 from control circuit 25 are initiated and terminated by field-synchronizing pulses and, thus, during field-retrace intervals, the timing changes of the line-synchronizing pulses impressed on line-sweep generator 29 also occur during field-retrace intervals. This precludes any distortion in the image reproduced in subscriber receivers that might occur should these timing changes take place during field-trace intervals. Moreover, an examination of curves D and E of Figure 2 reveals that each key-signal burst, representing a change in mode of operation at the transmitter, is transmitted to the subscriber receivers over line circuit 24 by an interval corresponding to approximately one field-trace interval before the actual change is effected by the corresponding pulse of curve E. Because of this, slight time delays of the key signal that might occur in the line circuit may be tolerated with no adverse effect on the proper operation of the subscription system.

The components of the subscription television transmitter thus far referred to, with the exception of units 12, 25 and 27 are well-known to the art and further description thereof is deemed to be unnecessary. The construction of stage 12 is to be described in great detail hereinafter. The control circuit 25 and coding circuit 27 are fully disclosed in copending application Serial No. 79,432, filed March 3, 1949, in the name of Albert Cotsworth III et al., and assigned to the present assignee. Since the present invention is not concerned with these circuits per se, it is believed unnecessary to include a detailed description thereof in this application.

Curve F of Figure 3 represents the line-synchronizing pulses pedestalled on suitable pedestal pulses and supplied to mixer amplifier 13. The jittered line-synchronizing pulses, that is to say pulses with a changing time relation, derived from keying circuit 27 are shown in curve G. During one mode of operation of the transmitter, designated mode "A," pulses are derived from keying circuit 27 with no change in timing and occur with respective leading edges in time coincidence with the leading edges of corresponding pedestal pulses of curve F. However, during the second mode of operation, designated mode "B," the pulses derived from keying circuit 27 are advanced a time "$t$" relative to the pulses derived during mode "A." As previously described, the mode "B" operation of the system occurs during the spaced intervals when control circuit 25 applies a pulse to keying circuit 27.

During the mode "B" operation of the transmitter, since the line-synchronizing pulses are advanced by the time $t$, the line scansion of device 10 is advanced a corresponding amount. This causes an advance in the timing of the video signal generated by device 10 relative to the line synchronizing and pedestal components as applied to mixer amplifier 13 and shown in curve F. Such timing changes in the video signal relative to the synchronizing pulses of the radiated composite television signal have been found to provide effective coding of the television broadcast. However, it may be shown that there is a picture or video unbalance in the composite signal derived from mixer 13.

Specifically, at the start of each line trace during mode "A" operation, there is a short interval $\Delta t_1$ of video information which does not appear during mode "B" since the shift in video signal relative to the blanking pedestals in the latter mode causes this portion of the video signal to fall within the interval of the adjacent pedestal. Additionally, there is a similar interval $\Delta t_2$ of video information at the end of each line trace during mode "B" operation which does not appear in mode "A" since in mode "A" this part of the video signal, likewise, falls within the adjacent pedestal. This gives rise to an unbalance of picture content as the timing of the video components changes relative to the synchronizing and pedestal components of the radiated signal in accordance with the coding schedule which determines the shift in modes of operation. Under some conditions, this change in picture content may cause distortion in the image reproduced by subscriber receivers. The purpose of transmitter stages 12 and 33 is to replace the portions of the video which appear in one mode but not in the other. In accordance with the invention, these portions are replaced by a composite signal formed by a random noise signal impressed on a series of pulses and having a combined amplitude extending, preferably, to the maximum or "black" value of the video signal.

The jittered line-synchronizing pulses from keying circuit 27 are applied to trigger circuit 33 to control the operation thereof and produce the pulses shown in curve J. Trigger circuit 33 may take the form of a multivibrator constructed in a manner well-known to the art and, preferably, contains a width control for adjusting the width of its output pulses which are applied to video blanking stage 12. Stage 12, in a manner to be described, is so adjusted that the signal derived from mixer amplifier 13, as shown in curve K, includes a composite signal 40 during mode "A" operation and a composite signal 41 during mode "B" operation, these composite signals preferably having an amplitude corresponding to the maximum amplitude or "black" value of the video signal as previously mentioned.

Each composite signal 40 overlaps a line-synchronizing pedestal pulse and during mode "A" intervals extends beyond the trailing edge thereof by an amount determined by the trailing edge of the pulses of curve J which, in turn, is determined by the width adjustment of trigger circuit 33. Preferably, the width adjustment causes the projecting portion of each signal 40 to occur in the intervals $\Delta t_1$ to replace the video information in such intervals. Similarly, each signal 41 of mode "B" intervals overlaps and projects beyond the leading edge of a line-pedestal pulse to replace video information in the intervals $\Delta t_2$. This time relation is controlled by the pulses of curve G which are delivered by keying circuit 27 to trigger circuit 33 to control the initiation of the pulses generated thereby. In this manner, the previously described distortion that sometimes occurs in subscription television signals due to the inequality of picture content is eliminated.

A detailed diagram of blanking stage 12 of Figure 1 is shown in Figure 4. This stage includes a pair of input terminals 50 connected to video amplifier 11. One of the terminals 50 is connected to ground and the other is connected to a control electrode 51 of an electron-discharge device 52 through a coupling capacitor 53, the control electrode being connected to ground through grid resistor 54. The circuit includes a second pair of input terminals 55 connected to trigger circuit 33, to derive negative-polarity pulses therefrom, as shown by the wave form 55'. One of the terminals 55 is connected to ground and the other is coupled to a second control electrode 56 of device 52 through a coupling capacitor 57, electrode 56 being connected to ground through a grid-leak resistor 58. The cathode 59 of device 52 is connected to ground through a resistor 60 which is shunted by a bypass capacitor 61. The screen grid 62 of device 52 is connected to the positive terminal of a source of unidirectional potential 63, and anode 64 is connected to this terminal through a load resistor 65.

The blanking circuit includes a third pair of input terminals 66 connected to trigger circuit 33 to derive positive polarity pulses therefrom as shown in waveform 66'. One of the terminals 66 is connected to ground and to one end of a potentiometer 67, and the other is connected to the other end of this potentiometer. Potentiometer 67 has an adjustable tap 68 associated therewith, and this tap is coupled to a control electrode 69 of an electron-discharge device 70 through a coupling capacitor 71, the control electrode being connected to ground through a grid-leak resistor 72. Cathode 73 of device 70 is directly connected to ground and anode 74 of this device is connected to the positive terminal of a unidirectional potential source 75 through a load resistor 76. A further control electrode 77 of device 70 is connected to a random noise generator 78 through a capacitor 79 and to ground through a grid-leak resistor 80.

The random signal generator 78 comprises a gaseous discharge device 81 having its anode connected to the positive terminal of a unidirectional potential source 82 through a load resistor 83, and its cathode connected to ground. The anode of device 81 is coupled to a control electrode 84 of an amplifier 85 through a coupling capacitor 86, the control electrode being connected to ground through a grid-leak resistor 87. Anode 88 of amplifier 85 is connected to the positive terminal of source 82 through a load resistor 89 and cathode 90 of the amplifier is connected to ground. Anode 88 is connected to capacitor 79 through a low-pass filter network which includes inductance coils 91, 92 and a capacitor 93 coupling the junction of these coils to ground.

Gaseous discharge device 81 is connected between the positive terminal of unidirectional source 82 and ground, and this causes a space current of random characteristics to flow through the device. The space current flow produces a random noise signal across resistor 83, which is amplified in device 85. The filter network is usually adjusted so that it passes noise signal frequencies from device 85 up to 200 C. P. S.

Electron-discharge device 70 acts as a mixer, and the signal of wave form 94 is produced in its output circuit in response to the positive-polarity pulses 66′ applied to control electrode 69 and the noise signal 95 derived from generator 78 and applied to control electrode 77.

The anode 74 of device 70 is coupled to a control electrode 96 of an electron-discharge device 97 through a coupling capacitor 98, the control electrode being connected to ground through a grid leak resistor 99. Cathode 100 of device 97 is connected to ground and anode 101 of this device is connected to the positive terminal of source 75 through a load resistor 102. Device 97 acts as a phase inverter and the signal of waveform 112 is produced in its output circuit in response to signal 94 applied to control electrode 96.

Anode 101 of device 97 is coupled to a control electrode 103 of an electron-discharge device 104 through a coupling capacitor 105, the control electrode being connected to ground through a grid-leak resistor 106. Cathode 107 of device 104 is connected directly to ground, and anode 108 of this device is directly connected to anode 64 of device 52. Anodes 64, 108 are connected to one of the output terminals 109 of the blanking circuit, the other output terminal being connected to ground. As shown in Figure 1, output terminals 109 are connected to mixer amplifier 13.

The blanking circuit of Figure 4 is so constructed that during the intervals between the pulses 55′, 66′, produced by trigger circuit 33, device 52 is conductive and device 104 is non-conductive. During these intervals, the video signal from video amplifier 11 (which is applied across terminals 50) is amplified by device 52 and appears across output terminals 109 for application to mixer amplifier 13. For the duration of each pulse from trigger circuit 33, however, the negative polarity pulse impressed across input terminals 55 drives control electrode 56 in a negative direction and renders device 52 non-conductive to the video signal. With device 52 non-conductive, the signal level represented by its anode potential is a fixed shade value and may be considered to correspond to the maximum or "black" value of the video signal. Accordingly, the signal potential at output terminals 109 due solely to the presence of the negative pulse on electrode 56 has a certain preselected level irrespective of the instantaneous value of the video signal on electrode 51. In this manner, a pulse is introduced into the video signal during the intervals of the control pulses applied to terminals 55.

As previously described, it is desirable that the aforesaid pulse have no fixed reference level in order to prevent unauthorized synchronization thereon. This is accomplished by the circuit of device 104 which may be considered to be a control network and which receives a control pulse of positive polarity and adjustable amplitude during the interval of the aforesaid pulse. This control pulse has a random noise signal superimposed thereon as indicated by waveform 112. This latter signal appears with negative polarity in the common output circuit of devices 52 and 104 and is superposed on the aforesaid pulse which is of positive polarity. Adjustment of tap 68 controls the amplitude of the resultant composite signal appearing at output terminals 109. Preferably, the tap adjustment is such that the resultant signal is of positive polarity and has a peak amplitude corresponding to the maximum amplitude of the video signal.

Accordingly, with the blanking stage of Figure 4 interposed between video amplifier 11 and mixer amplifier 13 of Figure 1 and actuated by trigger circuit 33, selected portions of each line-trace interval of the video signal may be replaced by composite signals of controllable amplitude. Since the jittered synchronizing pulses of curve G control the timing of trigger circuit 33 and vary its timing with changes in operating mode of the transmitter, the replaced portions of the video line-trace intervals are altered to maintain an equality of picture content in successive fields regardless of the mode of operation.

This invention provides, therefore, an improved type of subscription television transmitter in which a distortion that sometimes occurs in the coded television signal, due to inequality of picture content in successive video fields, is eliminated for all practical purposes. This is effected by replacing a portion of each line trace of video information by a composite signal, the timing of which changes in correspondence with mode changes of the transmitted signal, and by controlling this composite signal to have such a characteristic that unauthorized synchronization thereon is precluded.

While a particular embodiment of the invention has been shown and described modifications may be made and it is intended in the appended claims to cover all such modifications as fall within the true spirit and scope of the invention.

I claim:

1. A subscriber television transmitter comprising: a video-signal source for developing a video signal during recurring line-trace intervals; a synchronizing-signal source for developing a synchronizing signal during interposed retrace intervals indicating a timing function of said video source and normally having a certain time relation with respect to said trace intervals; a coding circuit for altering the timing of said trace intervals with respect to said synchronizing signal during spaced operating intervals; a blanking circuit coupled to said video-signal source for selectively suppressing portions of said video signal and introducing pulses in place thereof; a control circuit coupled to said blanking circuit for controlling the effective potential level of said pulses; a random-signal generator for producing a noise signal; means coupling said random-signal generator to said control circuit to superpose said noise signal on said pulses; and means controlled by said coding circuit for actuating said blanking circuit for a preselected portion of each of said line-trace intervals during normal operation of said transmitter and for a different preselected portion during said spaced operating intervals.

2. A subscriber television transmitter comprising: a video-signal source for developing a video signal during recurring line-trace intervals; a synchronizing-signal source for developing a synchronizing signal during interposed retrace intervals indicating a timing function of said video source and normally having a certain time relation with respect to said trace intervals; a coding circuit for altering the timing of said trace intervals with respect to said synchronizing signal during spaced operating intervals; a blanking circuit coupled to said video-signal source for selectively suppressing portions of said video signal and introducing pulses in place thereof; a control circuit coupled to said blanking circuit for controlling the effective potential level of said pulses; a random-signal generator for producing a noise signal; means coupling said random-signal generator to said control circuit for causing said noise signal to be superimposed on said pulses to form a composite signal having a peak amplitude corresponding to the maximum amplitude value of said video signal; and means controlled by said coding circuit for actuating said blanking circuit for a preselected portion of each of said line trace intervals during normal operation of said transmitter, and for a different preselected portion during said spaced operating intervals.

3. A subscriber television transmitter comprising: a video-signal source for developing a video signal during recurring line-trace intervals; a synchronizing-signal source for developing a synchronizing signal during interposed retrace intervals indicating a timing function of said video source and normally having a certain time relation with respect to said trace intervals; a coding circuit for altering the timing of said trace intervals with respect to said synchronizing signal during spaced operating intervals; a blanking circuit coupled to said video signal source for selectively suppressing portions of said video signal and introducing pulses in place thereof; a control circuit coupled to said blanking circuit for controlling the effective potential level of said pulses; a random-signal generator for producing a noise signal; means coupling said random-signal generator to said control circuit for causing said noise signal to be superimposed on said pulses to form a composite signal; and means controlled by said coding circuit for actuating said blanking circuit for a preselected period at the beginning of each of said line trace intervals during normal operation of said transmitter, and for a preselected period at the end of each of said line trace intervals during said spaced operating intervals.

4. A subscriber television transmitter comprising: a video-signal source for developing a video signal during recurring line-trace intervals; a synchronizing-signal source for developing a synchronizing signal during interposed retrace intervals indicating a timing function of said video source and normally having a certain time relation with respect to said trace intervals; a coding circuit for altering the timing of said trace intervals with respect to said synchronizing signal during spaced operating intervals; a blanking circuit coupled to said video-signal source for selectively suppressing portions of said video signal and introducing pulses in place thereof; means controlled by said coding circuit for actuating said blanking circuit for a preselected portion of each of said line-trace intervals during normal operation of said transmitter and for a different preselected portion during said spaced operating intervals; and means, including a random-signal generator, for producing during intervals corresponding to said preselected portions of said line trace intervals a composite signal comprising noise-signal components superimposed on pulse components, and for impressing said composite signal on the aforesaid pulses.

References Cited in the file of this patent

UNITED STATES PATENTS

| Number | Name | Date |
|---|---|---|
| 2,510,046 | Ellett | May 30, 1950 |
| 2,545,770 | Ellett | Mar. 20, 1951 |
| 2,547,598 | Roschke | Apr. 3, 1951 |
| 2,570,188 | Aram et al. | Oct. 9, 1951 |
| 2,572,853 | Gray | Oct. 30, 1951 |